United States Patent
Baukal, Jr. et al.

[11] Patent Number: 5,413,476
[45] Date of Patent: May 9, 1995

[54] REDUCTION OF NITROGEN OXIDES IN OXYGEN-ENRICHED COMBUSTION PROCESSES

[75] Inventors: Charles E. Baukal, Jr., Harleysville; Augustine I. Dalton, Macungie, both of Pa.

[73] Assignee: Gas Research Institute, Chicago, Ill.

[21] Appl. No.: 58,697

[22] Filed: Apr. 13, 1993

[51] Int. Cl.$^6$ .................................................. F23M 3/04
[52] U.S. Cl. ..................................... 431/10; 431/190; 431/351
[58] Field of Search ................. 431/10, 351, 190; 1/11

[56] References Cited

U.S. PATENT DOCUMENTS

| | | | |
|---|---|---|---|
| 3,074,707 | 1/1963 | Humphries et al. | 263/53 |
| 3,291,182 | 12/1966 | Dow et al. | 431/10 |
| 3,441,634 | 4/1969 | Iken et al. | 263/53 |
| 3,488,700 | 1/1970 | Iken et al. | 263/33 |
| 3,820,320 | 6/1974 | Schirmer et al. | 60/39.06 |
| 4,021,186 | 5/1977 | Tenner | 431/10 |
| 4,054,028 | 10/1977 | Kawaguchi | 60/39.23 |
| 4,245,980 | 1/1981 | Reed et al. | 431/182 |
| 4,378,205 | 3/1983 | Anderson | 431/5 |
| 4,403,941 | 9/1983 | Okiura et al. | 431/10 |
| 4,488,869 | 12/1984 | Voorheis | 431/352 |
| 4,531,904 | 7/1985 | Sato et al. | 431/10 |
| 4,541,796 | 9/1985 | Anderson | 431/187 |
| 4,622,007 | 11/1986 | Gitman | 432/13 |
| 4,629,413 | 12/1986 | Michelson et al. | 431/9 |
| 4,693,680 | 9/1987 | Snyder et al. | 431/10 |
| 4,927,357 | 5/1990 | Yap | 432/22 |
| 4,931,013 | 6/1990 | Brahmbhah et al. | 431/10 |
| 5,000,102 | 3/1991 | Ho | 110/346 |
| 5,242,296 | 9/1993 | Tuson et al. | 431/10 |

FOREIGN PATENT DOCUMENTS

| | | | |
|---|---|---|---|
| 3346982 | 7/1985 | Germany | 431/351 |
| 2048456 | 10/1980 | United Kingdom. | |

OTHER PUBLICATIONS

Baukal, Jr., et al; "Nitric Oxide Measurements in Oxygen Enriched Air-Natural Gas Combustion Systems"; Am. Soc. of Mech. Eng, PD-vol. 30, pp. 75-79, 1990.

*Primary Examiner*—Carroll B. Dority
*Attorney, Agent, or Firm*—John M. Fernbacher

[57] ABSTRACT

A method for reducing the formation of nitrogen oxides ($NO_x$) in air-fuel and oxygen-enriched air-fuel burners is disclosed wherein oxygen is introduced directly into the visible flame of the burner, whereby the beneficial effects of oxygen enrichment and the reduced formation of $NO_x$ can be realized simultaneously in the operation of such burners.

7 Claims, 2 Drawing Sheets

REDUCTION OF NITROGEN OXIDES IN OXYGEN-ENRICHED COMBUSTION PROCESSES

FIELD OF THE INVENTION

The present invention relates to the reduction of nitrogen oxides in combustion processes, and in particular to oxygen-enriched combustion processes.

BACKGROUND OF THE INVENTION

The oxygen enrichment of combustion air is widely practiced in the operation of industrial furnaces and kilns in order to improve the operation of such combustion equipment. The benefits of oxygen enrichment are well-known and are associated chiefly with the reduction of nitrogen in the oxidant stream. Because oxygen enrichment increases flame temperatures and reduces the amount of nitrogen in the combustion products, benefits are realized in decreased fuel consumption, increased firing rate and furnace throughput, and reduced emissions of particulates and certain other contaminants due to lower flue gas volumes. The beneficial effects of oxygen enrichment can be offset, however, by increased amounts of nitrogen oxides ($NO_x$) in the combustion products which occur at increased levels of enrichment. These increased levels occur because the thermodynamics and kinetics of the $NO_x$ formation reactions favor increased $NO_x$ yields at the higher temperatures caused by oxygen enrichment. The increase in $NO_x$ formation during oxygen-enriched combustion is described in a paper entitled "Nitric Oxide Measurements in Oxygen-Enriched Air-Natural Gas Combustion Systems" by C. E. Baukal, Jr. and A. I. Dalton in the Proceedings of the Fossil Fuel Combustion Symposium 1990, ASME, PD-Vol. 30, pp. 75–79.

In the present application, the term $NO_x$ includes all oxides of nitrogen formed in the combustion process. The major portion of the $NO_x$ is NO, with a smaller portion being $NO_x$. Very small amounts of other nitrogen oxides are formed at the combustion conditions described herein.

The reduction of $NO_X$ formation in conventional burners which use air as the source of oxygen to support combustion can be realized by staging the combustion reactions in order to reduce flame temperatures. This is accomplished by partially combusting a portion of the fuel with a sub-stoichiometric amount of primary air and then adding the required amount of additional air as secondary air, and optionally tertiary air, to complete the combustion of the fuel. In a pre-mix burner, fuel and air are initially mixed and combusted in a burner cavity which opens into an enclosed combustion chamber such as a furnace or kiln. The reduction of $NO_x$ in such burners by staged combustion within the burner cavity is disclosed in representative U.S. Pat. Nos 3,820,320, 4,054,028, and 4,531,904. Alternately, at least a portion of the secondary air can be injected at the outlet of the burner so that the secondary combustion reactions occur largely in the enclosed combustion chamber or furnace which utilizes the heat produced by the burner. Such a method of $NO_x$ reduction is taught in U.S. Pat. Nos. 4,021,186, 4,245,980, and 4,488,869. Alternately, at least a portion of the secondary air and optionally tertiary air can be introduced directly into the furnace from ports in the furnace wall adjacent to the burner discharge so that the secondary combustion reactions occur completely within the furnace. This method of $NO_x$ reduction is disclosed in U.S. Pat. No. 4,629,413 and UK Patent Publication GB 2 048 456 A.

Staged combustion for $NO_x$ reduction in an air-fuel fired furnace can also be accomplished by the appropriate orientation and operation of multiple burners in the furnace. U.S. Pat. No. 4,403,941 discloses a method using burners oriented such that staged combustion zones are formed by primary burners with an air-fuel ratio of less than one, secondary burners downstream of the primary burners with an air-fuel ratio less than that of the primary burners, and air injection ports or afterburners downstream of the secondary burners.

U.S. Pat. No. 4,622,007 discloses a staged pre-mix burner in which fuel is combusted with oxygen or oxygen-enriched air in a first stage, and air is introduced in a second, downstream stage to complete the combustion process. Burner effluent then passes into a furnace. $NO_x$ is reduced by controlling and maximizing the amount of air introduced into the second, downstream stage relative to that introduced into the first stage. A post-mix burner and process in which fuel and oxygen or oxygen-enriched air are injected into a furnace in which the entire combustion process takes place are disclosed in U.S. Pat. Nos. 4,378,205 and 4,541,796. The injection of oxygen or oxygen-enriched air, through jets in the plane of the furnace wall surrounding a fuel injection jet also in the plane of the furnace wall, aspirates furnace gases into the oxygen jets before the oxygen mixes with the fuel, thereby lowering flame temperatures and thus reducing $NO_x$ formation.

U.S. Pat. No. 4,693,680 discloses a post-mix burner in which oxygen or oxygen-enriched air is injected through radially-spaced injection points located around a fuel injection point, all injection points being located in the plane of a furnace wall, wherein a smaller amount of oxidant is mixed with the fuel prior to injection into the furnace to stabilize the flame. By proper selection of the oxidant gas velocities, a stable flame is obtained. No discussion of $NO_x$ formation is presented in this patent.

U.S. Pat. No. 4,931,013 describes a burner which uses a lance protruding slightly beyond the burner face to inject pure oxygen at supersonic velocities into the flame. No discussion of $NO_x$ formation is presented in this patent.

Methods of injecting oxygen into rotary kilns to increase flame temperatures and improve kiln performance in the incineration of waste and the manufacture of cement and other materials are disclosed in U.S. Pat. Nos. 3,074,707, 3,441,634, 3,488,700, 4,927,357, and 5,000,102. In the method disclosed in each of these patents, a stream of oxygen is undershot or lanced indirectly into a the flame of an existing air-fuel burner to maximize heat transfer to the material in the kiln. The oxygen stream may also be directed toward the hot furnace charge and deflected therefrom indirectly into the flame. No discussion of $NO_x$ formation is presented in these patents.

Improved methods for reducing $NO_X$ emissions from furnaces, kilns, and other combustion equipment are required to meet increasingly stricter air quality regulations, particularly in oxygen-enriched combustion processes which can increase $NO_x$ formation over that of air-based combustion processes. Methods which modify existing combustion equipment without burner replacement will be particularly useful and economically attractive since is allows compliance without significant capital investment. The invention disclosed herein provides a simple, inexpensive, and effective method to reduce $NO_x$ formation in existing air-based or oxygen-enriched combustion processes, or alternatively is a method which is useful in the design and operation of new installations of such combustion processes.

SUMMARY OF THE INVENTION

The present invention is a method for reducing or maintaining the amount of nitrogen oxides in the effluent from a burner used to combust a fuel and an amount of air containing at least the stoichiometric amount of oxygen required to combust the fuel. The method comprises reducing the amount of air to a lower amount of air and introducing an oxidizing gas containing greater than 21 vol % oxygen directly into a region of the visible flame produced by the burner, wherein the total amount of oxygen contained in the lower amount of air and the oxidizing gas is equal to at least the stoichiometric amount. The region is defined by $x/L > 0.3$ where $x$ is the axial distance from the point at which the effluent exits the burner and L is the total length of the visible flame produced by the burner, whereby the beneficial effects of oxygen enrichment are realized without increasing the formation of nitrogen oxides in the operation of the burner. The outer limit of the region is defined by $x/L < 0.8$.

The invention is also a method for reducing the amount of nitrogen oxides in the effluent from a burner used to combust a fuel and oxygen-enriched air containing at least the stoichiometric amount of oxygen required to combust the fuel. The method comprises reducing the amount of oxygen in the oxygen-enriched air to a lower amount of oxygen and introducing an oxidizing gas containing greater than 21 vol % oxygen directly into the visible flame produced by the burner, wherein the total amount of oxygen contained in the lower amount of oxygen and the oxidizing gas is equal to at least the stoichiometric amount, whereby the beneficial effects of oxygen enrichment and the reduced formation of nitrogen oxides are realized simultaneously in the operation of the burner.

The invention is also an apparatus for reducing the amount of nitrogen oxides in the effluent from a burner used to combust fuel and oxidant gas in which the effluent passes into an enclosed combustion zone. The apparatus comprises an injection conduit having a discharge end for introducing an oxygen-containing gas directly into the visible flame produced by the burner, wherein at least one of the oxidant gas and the oxygen-containing gas contains greater than 21 vol % oxygen, the injection conduit extending into the enclosed combustion zone such that the oxygen-containing gas is injected directly into the flame.

By utilizing the method and apparatus of the present invention, the beneficial effects of oxygen enrichment without increasing the formation of nitrogen oxides ($NO_x$) is realized in the operation of the burner. At stoichiometric operation of the burner, the $NO_x$ formed by utilizing the present invention is less than that formed at an equivalent level of enrichment achieved by the prior art method of adding oxygen to the oxidant gas introduced to the burner. In addition, the $NO_x$ formed while utilizing the present invention is equal to or less than that formed by normal stoichiometric operation of the burner using air as the oxidant gas. The invention can be utilized to improve the operation of an existing burner, or can be incorporated into the design and installation of a new burner.

DETAILED DESCRIPTION OF THE INVENTION

It is well known in the combustion art that oxygen enrichment by the addition of high-purity oxygen to the air supply to the burner increases the formation of nitrogen oxides ($NO_x$) in the burner combustion products. Methods for reducing such $NO_x$ formation are necessary to meet the reduced $NO_x$ levels required by present and future air quality regulations, while at the same time realizing the well-known benefits of oxygen enrichment on combustion performance. It has been found in the present invention that introducing the oxygen for enrichment directly into the visible flame produced by a burner decreases the amount of $NO_x$ formed compared with the usual enrichment method in which the oxygen for enrichment is mixed with the burner air supply.

It also has been found that by injecting oxygen directly into a specific region of the visible flame, the amount of $NO_X$ formed is equal to or less than that produced by a burner operating on air with an equivalent stoichiometric amount of oxygen. This means that the benefits of oxygen enriched combustion, one of which is reduced flue gas volume, can be achieved at $NO_x$ levels below those of conventional air-based burners. The location of oxygen introduction into the flame is critical, and test furnace experiments later described showed that the oxygen must be introduced directly into the visible flame at a distance $x$, where $x$ is measured from the burner discharge point in an axial direction, such that $x/L$ is at least about 0.3, L being the total length of the visible flame produced by the burner as measured from the burner discharge point to the tip of the flame. The upper limit of $x/L$ is about 0.8, beyond which $NO_x$ formation begins to increase above that of conventional air-based burners.

The optimum location of oxygen injection for minimum $NO_x$ formation is a value of $x/L$ between about 0.40 and 0.60 for either of the above two methods of operation.

Figure 1:
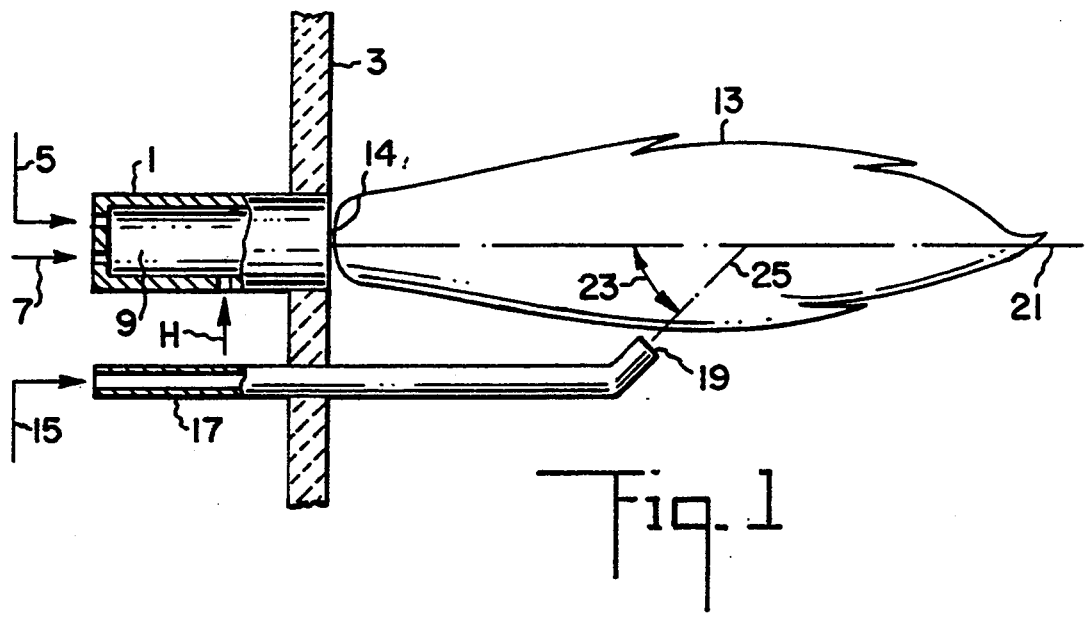
FIG. 1 is a schematic drawing showing oxygen injection into a combustion flame according to the present invention.

The invention can be understood in greater detail by referring to FIG. 1. Burner 1 is mounted in wall 3 which encloses a combustion volume or furnace. Wall 3 is shown as a vertical wall, but can be any enclosing structure such as for example a floor or ceiling of a furnace. Oxidant gas 5 is introduced into burner 1 along with fuel 7 and combustion takes place in burner cavity 9. Additional oxidant gas 11 optionally may be introduced into burner 1 for improved combustion. Burner 1 can be any type selected from a wide variety of burners known in the art and utilized in the operation of furnaces, kilns, and other combustion equipment. Oxidant gas 5 can be air or oxygen-enriched air, and fuel 7 can be any combustible fluid hydrocarbon but is preferably natural gas. Visible flame 13 is produced by the combustion effluent from burner discharge 14 and extends into the combustion volume or furnace defined by the enclosing surface shown as wall 3. In the method of the present invention, oxygen-containing gas 15 is introduced through injection conduit 17 and is injected through discharge end 19 directly into flame 13.

Burner 1 is typically operated stoichiometrically so that the total amount of oxygen in oxidant gas 5 and optionally oxygen-containing gas 15 is sufficient to completely combust fuel 7. Alternately, a slight excess of oxygen can be supplied in oxidant gas 5 to ensure complete combustion. In one mode of operation of the present invention, oxidant gas 5 is air, and oxygen-containing gas 15 contains greater than 21 vol % oxygen and is preferably high purity oxygen containing at least about 90 vol % oxygen. Alternately, oxidant gas 5 is enriched air and oxygen-containing gas 15 contains greater than 21 vol % oxygen and is preferably high purity oxygen containing at least about 90 vol % oxygen. In another alternate mode, both oxidant gas 5 and oxygen-containing gas 15 can be enriched air. Additional air or enriched air shown schematically as stream 11 optionally can be added to improve burner performance, as is practiced in the operation of burners in many types of existing combustion equipment.

Injection conduit 17 can be installed at alternate locations in the furnace relative to burner 1 for direct injection of the oxygen-containing gas into the flame. For example, if burner 1 is located in a vertical wall as shown in FIG. 1, injection conduit can be located above or beside the burner. Alternately, injection conduit 17 could be installed vertically from the floor or ceiling of a furnace to inject the oxygen-containing gas directly into the flame. Other orientations of the burner and injection conduit are possible; for example, a floor-mounted burner firing vertically could be used with a vertically-oriented injection conduit beside the burner. Conduit 17 can be constructed of ceramic or other suitable heat resistant material, or can be a cooled metal conduit.

While the relative location of burner 1 and injection conduit 17 are not critical to the invention, it is critical that the oxygen-containing gas be injected directly into the flame as shown for example in FIG. 1, such that there is minimal intermixing of the injected gas with the furnace gases surrounding the flame. Thus the term direct injection as used in the present specification means that there is minimal or essentially no mixing between the injected gas and the surrounding furnace gases. This can be accomplished by locating end 19 of injection conduit 17 at the edge of flame 13 as shown in FIG. 1, or optionally the end 19 of conduit 17 can extend inside the flame. Optionally, end 19 can be located outside of flame 13 if the velocity of the injected oxygen-containing gas is sufficiently high such that there is essentially no intermixing of the gas and the surrounding furnace gases. In general, when injection conduit 17 enters furnace wall 3 at a point removed from burner 1, end 19 of conduit 17 should be located preferably such that $0 < r/R < 4$ where r is the perpendicular or minimum distance between end 19 and centerline 21 and R is the radius of flame 13 at a given axial distance from burner discharge 14. When injection conduit 17 enters furnace wall 3 at a point removed from burner 1, the included angle between centerline 21 of flame 13 and centerline 25 of injection conduit 17 at end 19 should be between about 45 and about 90 degrees. The flow direction of the injected gas follows centerline 25.

When burner 1 is operated as a conventional burner under stoichiometric conditions in which oxidant gas 5 is air, $NO_x$ formation can be reduced by the present invention by decreasing the flow of air to a substoichiometric amount, and injecting enriched air or preferably high purity oxygen into the flame in an amount sufficient to yield stoichiometric operation of the burner. In this case, the injected gas should be introduced into the flame at a location such that $0.3 < x/L < 0.8$ where x is the axial distance from discharge 14 of burner 1 in the direction of the flame centerline 21 and L is the total length of the flame as measured from discharge 14. Operation of the present invention at these conditions therefore allows decreased $NO_x$ formation and the benefits of oxygen enrichment such as for example reduced flue gas volumes.

When burner 1 is operated under stoichiometric conditions using oxygen-enriched air as oxidant gas 5, $NO_x$ formation can be reduced by the present invention by decreasing the flow or oxygen content of oxidant gas 5, and injecting the equivalent amount of oxygen as enriched air or preferably high purity oxygen containing at least 90 vol % oxygen into any region of flame 13. The invention also can be used to reduce $NO_x$ formation when burner 1 is initially operated with a stoichiometric excess of oxygen, either as air or as enriched air, which is often done to ensure complete combustion of fuel 7. In such cases, an amount of oxygen is backed out of oxidant gas 5 and injected instead directly into the flame as described above. If all of the enriching oxygen is backed out of oxidant gas 5, the burner operates as an air-fuel burner and all enrichment is supplied by injecting oxygen directly into the flame. Typically, the amount of oxygen injected into the flame is between about 10 and 20% of the stoichiometric amount.

Burner 1 alternately can be operated such that oxidant gas 5 is a stoichiometric amount of air and oxygen is injected directly into the flame, resulting in an overall excess of oxygen in the burner operation. It has been found, as later discussed, that $NO_x$ formation in this mode of operation is less than the $NO_x$ formation when the burner is operated at stoichiometric conditions using enriched air to the burner.

Figure 2:
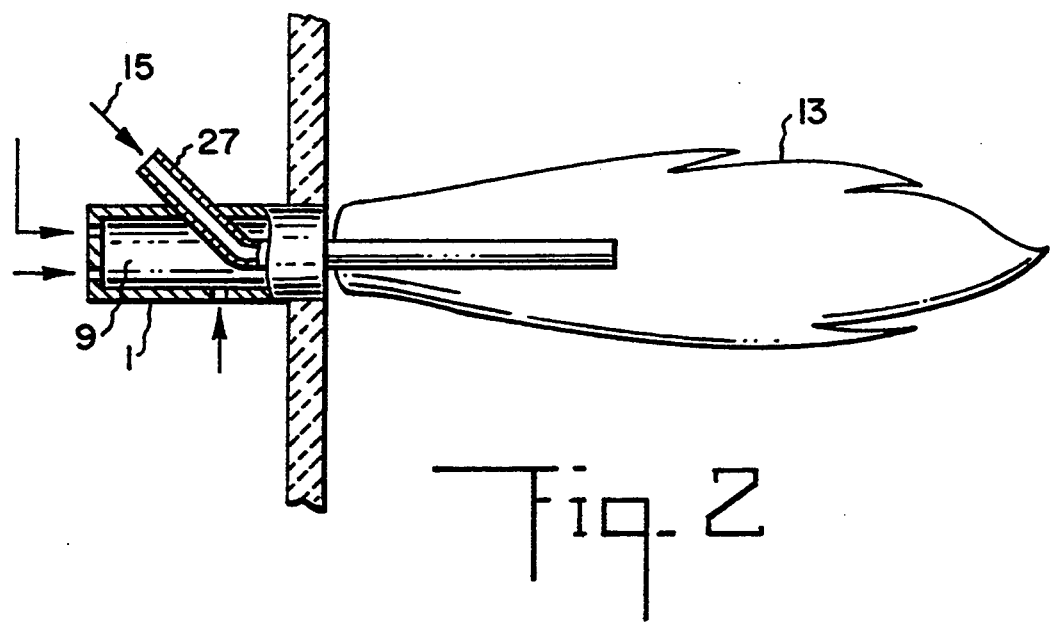
FIG. 2 is a schematic drawing of an alternative method of oxygen injection into the combustion flame according to the present invention.

An alternate mode for injecting oxygen into the flame is shown in FIG. 2. In this mode, oxygen-containing gas 15 is injected directly into flame 13 through conduit 27 which extends directly into and through burner 1 and burner cavity 9 and into flame 13. The actual structure of conduit 27 and its installation relative to burner 1 is not critical except that end 29 must extend into flame 13. Conduit 27 can be constructed of ceramic or other suitable heat resistant material, or can be a cooled metal conduit.

Optionally, an injection conduit having more than one opening or jet can be used to inject the oxygen-containing gas at multiple points in the flame. It is also possible to use two or more injection conduits, for example when the control of flame shape or direction is important in a specific combustion process application.

EXAMPLE 1

Combustion experiments were carried out in a refractory-lined, water-cooled test furnace with a burner firing horizontally at one end and a flue located at the opposite end. The inside furnace dimensions were 7 feet high, 8 feet wide, and 17.7 feet long between burner and flue, was capable of firing burners rated up to 10 million BTU/hr, and could achieve temperatures in excess of 2000° F. The furnace was equipped with access ports along the sidewall for temperature measurements, gas sampling and injection, and heat transfer determinations. Analytical instrumentation and a data logging system were used to monitor and record air, oxygen, and fuel flow rates, furnace temperatures, gas temperatures, and flue gas composition including $NO_x$, CO, $CO_2$, and excess oxygen. With each experiment, the furnace was allowed to reach equilibrium temperature under each set of test conditions, while process variables were monitored continuously.

Experimental tests were conducted with a standard North American 4425 air-fuel burner fired with commercial pipeline natural gas (97 vol % methane). The burner consists of a central circular fuel nozzle located on the axial centerline surrounded by eight circular oxidant nozzles symmetrically spaced at a fixed radial distance from the central fuel nozzle. A cylindrical mixing chamber refractory block was located just downstream of the fuel and oxidant nozzles. The burner was self-cooled and the furnace pressure was controlled to prevent air infiltration. In the tests using enriched air, high purity oxygen (greater than 99.5 vol % oxygen) was premixed with the appropriate amount of combustion air to achieve the desired enrichment levels. Oxygen was injected directly into the flame through a series of ceramic tubes located along the length of the flame.

Initial tests were run to establish a NO baseline for the air-fuel burner over a range of firing rates, maintaining the $O_2:CH_4$ molar ratio of 2.0 which is the stoichiometric level. Table 1 gives the resulting $NO_x$ baseline levels for the air-fuel burner operation.

TABLE 1

| $NO_x$ Baseline for Air-Fuel Operation | |
|---|---|
| Firing Rate, MM BTU/Hr | $NO_x$ Produced, lb $NO_x$/MM BTU Fired |
| 1.50 | 0.098 |
| 1.75 | 0.103 |
| 2.00 | 0.102 |
| 2.25 | 0.100 |
| 2.50 | 0.099 |

EXAMPLE 2

The test furnace described in Example 1 was fired with air-natural gas at 2.0 MMBTU/hr over a range of $O_2:CH_4$ molar ratios between 1.8 and 2.5. High purity oxygen (greater than 99.5 vol % oxygen) was then used to enrich the burner air supply while maintaining the $O_2:CH_4$ molar ratios between 1.8 and 2.5. The results of these tests are summarized in Table 2.

TABLE 2

| Oxygen Enrichment of Combustion Air | | |
|---|---|---|
| $O_2$ in Combustion Air, Vol % | $O_2:CH_4$ Molar Ratio | $NO_x$ Produced, lb $NO_x$/MM BTU Fired |
| 21 | 1.8 | 0.095 |
| 21 | 1.9 | 0.100 |
| 21 | 2.0 | 0.109 |
| 21 | 2.5 | 0.124 |
| 24 | 2.0 | 0.152 |
| 28 | 1.8 | 0.200 |
| 28 | 2.0 | 0.217 |
| 28 | 2.5 | 0.309 |

These results show that $NO_x$ formation increases dramatically as oxygen enrichment of the combustion air to the burner is increased. This result generally agrees with work by others in the combustion field for several other commercially available burners, for example U.S. Department of Energy report #DOE/ID/12597-2, "Oxygen Enriched Combustion System Performance Study, Vol III - Burner Tests and Combustion Modeling", Y. Kwan, et al., September 1988.

EXAMPLE 3

The test furnace of Example 1 was operated in a series of runs to investigate the injection of oxygen directly into the flame and the resulting formation of $NO_x$. The burner was operated at the reference firing rate of 2.0 MMBTU/hr with air and natural gas at an $O_2:CH_4$ stoichiometric molar ratio of 2.0. The combustion air was then enriched to 22.8 vol % oxygen by premixing oxygen with the burner air supply while decreasing the air flow rate to maintain the overall $O_2:CH_4$ molar ratio of 2.0. This is the normal method of operating enriched premix burners. Next, high purity oxygen (greater than 99.5 vol % oxygen) was injected directly into the visible flame at a rate equal to 10% of the stoichiometric amount, with the remaining 90% of the required oxygen being supplied as air to the burner. The oxygen was injected directly into the flame at the edge of the flame through ceramic tubes located at various points along the length of the flame. The tubes were oriented such that their centerlines formed a 90° angle with the centerline of the visible flame which had a length of about 8 feet. $NO_x$ concentrations in the flue gas were measured in each run. The results of these runs are summarized in Table 3 and FIG. 3.

TABLE 3

| Effect of Oxygen Injection Directly Into Flame | | | | |
|---|---|---|---|---|
| Equivalent Enrichment Level, % $O_2$ | $O_2$ Injection Distance From Burner, ft | $O_2:CH_4$ Molar Ratio To Burner | Overall | $NO_x$ Produced, lb $NO_x$/MM BTU Fired |
| 21 (Air) | 0 | 2.0 | 2.0 | 0.104 |
| 22.8 | 0 | 2.0 | 2.0 | 0.201 |
| 22.8 | 2 | 1.8 | 2.0 | 0.127 |
| 22.8 | 3.5 | 1.8 | 2.0 | 0.108 |
| 22.8 | 5 | 1.8 | 2.0 | 0.098 |
| 22.8 | 7 | 1.8 | 2.0 | 0.112 |

Figure 3:
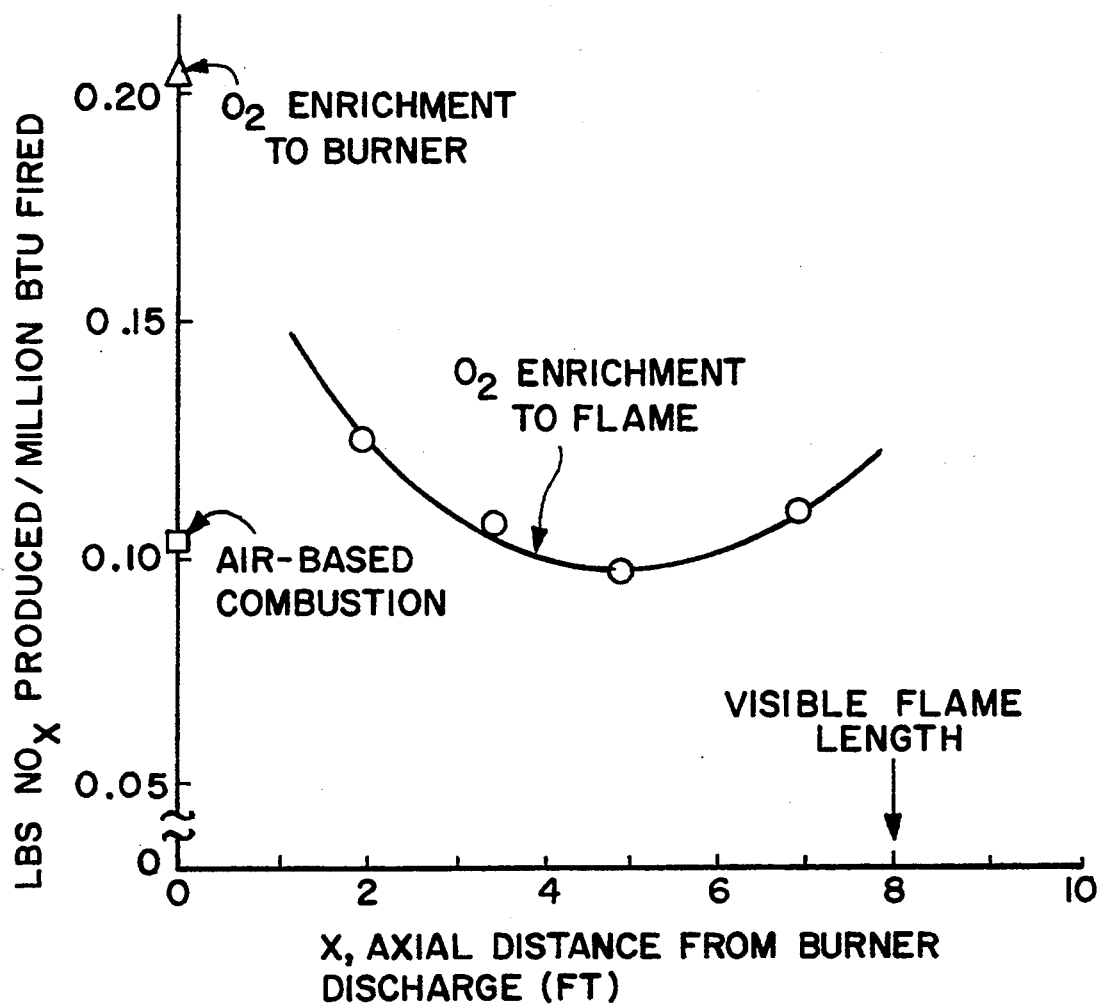
FIG. 3 is a graph showing the effect of the location of oxygen addition on the level of $NO_x$ formation.

The results given in Table 3 and FIG. 3 show clearly that $NO_x$ formation is reduced as the injection point is moved away from the burner. When compared with the enriched air burner operation, the injection of oxygen directly into the flame reduced $NO_x$ formation at all four points of injection, which indicates that enrichment oxygen is preferably injected into the flame rather than premixed with burner air as is commonly practiced. The results also show that injection of oxygen into the flame at points between about 3 and 7 feet from the burner yields $NO_x$ levels less than or equal to conventional air-based combustion without enrichment.

EXAMPLE 4

Additional experiments were carried out using the procedures of Example 3 to investigate other stoichiometries or $O_2:CH_4$ molar ratios. For these experiments, oxygen was injected into the flame at 3.5 feet from the burner discharge. Results of these experiments are given in Table 4.

TABLE 4

Effect of $O_2:CH_4$ Molar Ratio on $NO_x$ Formation

| Equivalent Enrichment Level, % $O_2$ | $O_2:CH_4$ Molar Ratio | | $NO_x$ Produced, lb $NO_x$/MM BTU Fired |
|---|---|---|---|
| | In Burner | Overall | |
| 22.8 | 2.0 | 2.2 | 0.126 |
| 23.8 | 1.7 | 2.0 | 0.118 |
| 24.9 | 1.6 | 2.0 | 0.119 |

The results of these experiments show that $NO_x$ formation in the present invention at other $O_2:CH_4$ molar ratios is lower than $NO_x$ formation by conventional enriched air burners. The result of the first experiment shown in Table 4 is of particular interest because it shows that injection of excess oxygen directly into the flame from a stoichiometric air-fuel burner produces less $NO_x$ than operation of the burner using enriched air at stoichiometric conditions. The data al so show that $NO_x$ levels can be maintained using even higher levels of enrichment if the burner $O_2:CH_4$ molar ratio is further reduced and the equivalent amount of oxygen is lanced into the flame.

The present invention thus offers an improved method for operating air-fuel burners or enriched air-fuel burners such that $NO_x$ formation is maintained or reduced compared with the base operation while simultaneously realizing the benefits of oxygen enrichment. The invention can be used to improve the performance of existing burner systems, or can be incorporated into the design and operation of new burner systems for operation at reduced $NO_x$ levels.

The essential characteristics of the present invention are described completely in the foregoing disclosure. One skilled in the art can understand the invention and make various modifications thereto without departing from the basic spirit thereof, and without departing from the scope and range of equivalents of the claims which follow.

We claim:

1. A method for operating a burner used to combust a fuel which method comprises introducing oxygen-enriched air and said fuel into said burner and combusting the resulting combustible mixture, and introducing an oxidizing gas containing oxygen or oxygen enriched air at a point of injection directly into a region of the visible flame produced by said burner, wherein the total amount of oxygen contained in said oxygen-enriched air and said oxidizing gas is equal to at least the stoichiometric amount such that the molar ratio of said total amount of oxygen to said fuel is at least 2.0, said region being defined by $x/L > 0.3$ where x is the axial distance from the point at which combustion products exit said burner and L is the total length of the visible flame produced by said burner, and wherein said oxidizing gas is injected into said flame such that essentially no mixing occurs between said oxidizing gas and the furnace gases surrounding said flame, whereby the beneficial effects of oxygen enrichment are realized while decreasing the formation of nitrogen oxides in the operation of said burner, said beneficial effects including reduced amounts of nitrogen to said burner and in said combustion products.

2. The method of claim 1 wherein said region is further defined by $x/L < 0.8$.

3. The method of claim 1 wherein said oxidizing gas contains between 10% and 20% of said stoichiometric amount of oxygen required to combust said fuel.

4. The method of claim 1 wherein said oxidizing gas is high purity oxygen containing greater than about 90 vol % oxygen.

5. The method of claim 1 wherein said fuel is natural gas.

6. The method of claim 1 wherein said point of injection is disposed at a radial location defined by $0 < r/R < 4$, where r is the perpendicular distance between said point of injection and the centerline of said visible flame and R is the radius of said flame at said point of injection.

7. The method of claim 6 wherein the flow direction of said oxidizing gas at said radial location defines an included angle of between about 45 and about 90 degrees with the centerline of said visible flame.

* * * * *